UNITED STATES PATENT OFFICE.

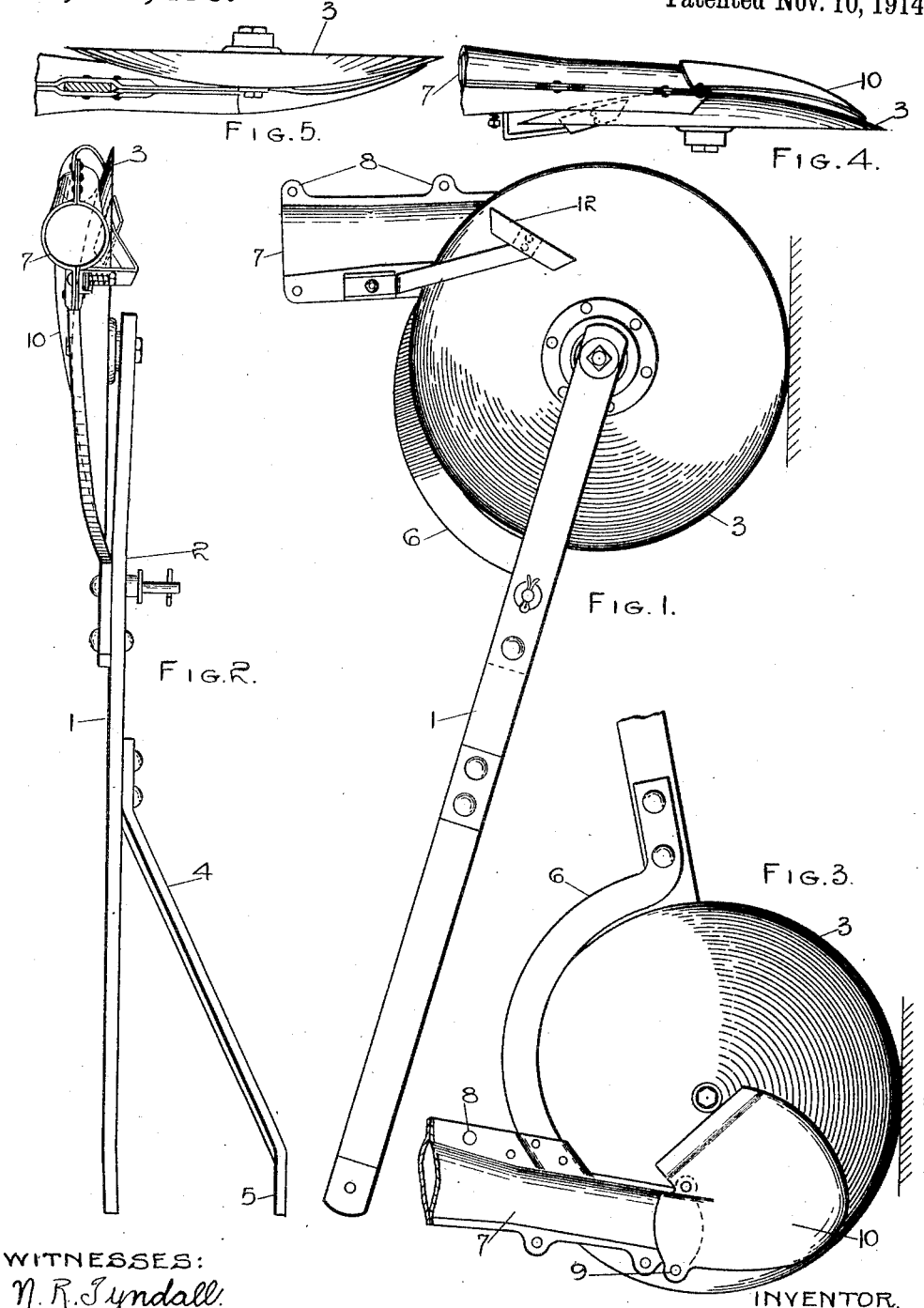

OTTO GEORGE RIESKE, OF TORONTO, ONTARIO, CANADA, ASSIGNOR TO MASSEY-HARRIS COMPANY, LIMITED, OF TORONTO, CANADA.

DISK DRILL.

1,116,486. Specification of Letters Patent. Patented Nov. 10, 1914.

Application filed July 2, 1913. Serial No. 777,017.

*To all whom it may concern:*

Be it known that I, OTTO G. RIESKE, of the city of Toronto, Province of Ontario, Canada, have invented certain new and useful Improvements in Disk Drills, of which the following is a specification.

This invention relates to seed drills of the type in which a rotary disk carried by drag bars is used to open the drill for the seed and my object is to devise a simple and strong construction of the drill and particularly of the carrying arm and grain tube or boot and grain shield in which cast metal is entirely eliminated.

I attain my object by means of the constructions hereinafter specifically described and illustrated in the accompanying drawings in which—

Figure 1 is a side elevation of a disk drill, constructed in accordance with my invention. Fig. 2 is a plan view of the same. Fig. 3 is a side elevation of part of the same taken from the other side of Fig. 1. Fig. 4 is a rear elevation of the boot and seed distributer. Fig. 5 is a front elevation of the same.

In the drawings like numerals of reference indicate corresponding parts in the different figures.

1 is the drag bar slightly bent at 2 to bring the edge of the disk 3 into the line of draft of the drag bar. The disk, which is concavo-convex in form, is journaled on the drag bar with its concave side to the bar in a suitable manner. The side brace 4 is secured to the drag bar intermediate its ends, and extended forwardly, the forward end of both the drag bar and side brace being brought into parallelism to form the attaching lugs 5 by means of which they are secured to the frame of the drill.

A curved boot carrying arm 6 is bolted or otherwise secured to the drag bar 1 forward of the disk, crosses at once to the convex side of the disk and extends rearwardly to a point adjacent the convex side of the disk near the top. To this arm is secured the sheet metal boot or grain tube 7 reaching down to about the center line of the disk. This boot is formed in halves, provided with the lugs or flanges 8 contacting with one another and secured together by means of the rivets. The flanges at the forward side of the boot are shaped to form a socket to receive and embrace the arm 6, and the flanges and arm are secured together by through rivets. The boot at its lower end curves slightly in toward the disk to suit the inward curve of the seed distributer.

The seed distributer and grain shield 10 is formed of a sheet metal stamping and hugs the convex surface of the disk closely at its forward side. The distributer is curved down toward the cutting edge of the disk and owing to the convexity of the disk has gradually increasing clearance therefrom toward the rear, affording a space through which the seed drops close against the surface of the disk. The distributer is also slightly curved in at the bottom edge to lead the grain toward the disk and to the bottom of the furrow. This distributer at its upper side overlaps, and is shaped to fit against the side of the boot 7 above the center of the disk, and is also shaped to overlap the lower lugs 8 of the boot, being secured in place by the same rivets 9 which secure the halves of the boot together. An ordinary scraper 12 is carried by the boot to engage the concave side of the disk.

From the above description it will be seen that I have devised a construction which practically entirely avoids the use of cast metal, all the main parts being formed of rolled, stamped or forged metal. I obtain in this way a very strong, durable and neat construction and also reduce the cost of manufacture.

What I claim as my invention is:

1. In a single disk drill the combination of a concavo-convex disk; a drag bar on which said disk is journaled with its concave side to the said drag bar; a carrying arm fastened to the drag bar in front of the disk and curved out toward the convex side of the disk, also upwardly and then downwardly at its rear end; a boot formed of two sheet metal plates shaped to form a socket at or about the middle of the boot in which the end of the carrying arm is secured, said boot reaching down to about the center line of the disk; and a seed distributer and grain shield fastened to the lower end of the boot and curved down toward the cutting line of the disk lying close to the convex side of the disk in front and open toward the rear and slightly curved in at the bottom edge to lead the grain toward the disk and to the bottom of the furrow.

2. In a single disk drill the combination of a concavo-convex disk; a drag bar on which said disk is journaled with its concave side to the said drag bar; a carrying arm fastened to the drag bar in front of the disk and curved out toward the convex side of the disk, also upwardly and then downwardly at its rear end, a boot formed of two sheet metal plates shaped to form a socket at or about the middle of the boot in which the end of the carrying arm is secured, said boot reaching down to about the center line of the disk, and a seed distributer and grain shield overlapping and fastened to the lower end of the boot and curved down toward the cutting line of the disk lying close to the convex side of the disk in front and open toward the rear and slightly curved in at the bottom edge to lead the grain toward the disk and to the bottom of the furrow.

Toronto, Ont., this 25th day of June 1913.

OTTO GEORGE RIESKE.

Signed in the presence of—
 F. R. FUNK,
 CHARLES McLEOD.

---

Copies of this patent may be obtained for five cents each, by addressing the "Commissioner of Patents, Washington, D. C."